United States Patent [19]

Vertegaal

[11] E Re. 30,143

[45] Reissued Nov. 13, 1979

[54] ROTATION SCREEN PRINTING MACHINE AND SQUEEGEE DEVICE

[75] Inventor: Jacobus G. Vertegaal, Boxmeer, Netherlands

[73] Assignee: Stork Amsterdam B.V., Amsterdam, Netherlands

[21] Appl. No.: 688,614

[22] Filed: May 21, 1976

Related U.S. Patent Documents

Reissue of:

[64] Patent No.: 3,933,093
Issued: Jan. 20, 1976
Appl. No.: 383,155
Filed: Jul. 27, 1973

U.S. Applications:

[63] Continuation-in-part of Ser. No. 811,787, Apr. 1, 1969, abandoned.

[30] Foreign Application Priority Data

Apr. 25, 1968 [NL] Netherlands ..... 6805845

[51] Int. Cl.[2] ..... B41L 13/04
[52] U.S. Cl. ..... 101/120
[58] Field of Search ..... 101/119, 120, 157, 169

[56] References Cited

U.S. PATENT DOCUMENTS

| | | | |
|---|---|---|---|
| 762,165 | 6/1904 | Hainey | 101/120 |
| 1,480,348 | 1/1924 | Cadgene et al. | 101/120 |
| 1,546,834 | 7/1925 | Haington | 101/122 UX |
| 2,071,824 | 2/1937 | Engert | 101/116 |
| 2,109,336 | 2/1938 | Marsden | 101/119 X |
| 2,363,137 | 11/1944 | Metcalf | 101/120 |
| 2,387,390 | 10/1945 | Goodwin | 101/120 |
| 2,665,634 | 1/1954 | Schwartz et al. | 101/120 |
| 2,928,340 | 3/1960 | Stein et al. | 101/120 |
| 3,006,275 | 10/1961 | Allen | 101/157 X |
| 3,029,780 | 4/1962 | Justus et al. | 118/126 |
| 3,155,034 | 11/1964 | Reinke | 101/120 |
| 3,158,497 | 11/1964 | Fird et al. | 101/157 X |

FOREIGN PATENT DOCUMENTS

| | | | |
|---|---|---|---|
| 1267231 | 5/1968 | Fed. Rep. of Germany | 101/119 |
| 2006887 | 2/1970 | France | 101/120 |
| 480949 | 12/1969 | Netherlands | |
| 483314 | 2/1970 | Switzerland | 101/120 |

*Primary Examiner*—J. Reed Fisher
*Attorney, Agent, or Firm*—Edmund M. Jaskiewicz

[57] ABSTRACT

A rotary screen printing machine of the type including at least one cylindrical stencil, each with a squeegee blade for forcing a printing fluid such as paint or paste through apertures in the stencil onto a textile web or sheet of paper. The squeegee of the present invention is formed as a thin flexible metal strip having a thickness less than 1% of the width of the portion of such strip protruding from its holder. The squeegee blade is suspended at two locations mounted in a holder, at least one location having transverse slot permitting lateral expansion and contraction to compensate for vertical deflection of the blade or of the holder.

6 Claims, 12 Drawing Figures

18
1
23
21
22
24
20
3
19
4
5
13

ROTATION SCREEN PRINTING MACHINE AND SQUEEGEE DEVICE

Matter enclosed in heavy brackets [ ] appears in the original patent but forms no part of this reissue specification; matter printed in italics indicates the additions made by reissue.

RELATED APPLICATION

This application is a continuation-in-part of the copending application Ser. No. 811,787 filed on Apr. 1, 1969, now abandoned by the same-named applicant.

The invention relates to a rotary screen printing machine provided with supporting members for the ends of one or more cylindrical stencils and with suspension members for a squeegee device disposed within the stencil and consisting of a squeegee holder with a fitting for a flexible squeegee blade, and with means for guiding the material to be printed. Different embodiments of such a machine are known in which it is always desired to construct the machine as wide as possible in order to permit the printing of a broad web or loose sheets.

However, there have been limits to the broader construction of the machine because to the deflection of the squeegee. This deflection causes a difference in the squeegee pressure of the central portion with respect to the outer portions of each cylindrical stencil. A second difficulty was experienced in that owing to the great length of the squeegee, its weight increased in such a way that trouble was encountered on pulling the squeegee device from and sliding it again into the cylindrical stencil, which is occasionally required.

It is an object of the invention to provide a machine provided with a light-weight squeegee device so that a very wide machine can be assembled therewith. This object is attached according to the invention in that the squeegee blade consists of a very thin steel strip the thickness of which is less than 1% of the width of the portion of the strip which freely protrudes from the fitting and greater than 0.1% of this width.

It has appeared by experiment that this squeegee blade can easily curve or deform in the direction of rotation of the stencil, whereby a low frictional resistance with the inner side of the stencil is produced. This deformation of the squeegee is already possible at a minor pressure, so that consequently the deflection of the squeegee holder under this pressing force is limited to a minimum.

It has further appeared that the new squeegee blade allows for an ideal deformation so that an angle of pressure ranging from 90° to 3° can be adjusted, which range is beyond the limits usually obtainable with the conventional squeegees. The squeegees blade is no longer liable to chemical corrosion due to solvents in the printing mass. The steel squeegee blade is naturally stiffer in its own plane than the previously used rubber squeegee blade, so that also in this respect a lighter construction can be applied, but, nevertheless, a sufficient bending strength (rigidity) in a vertical plane is obtained.

The invention relates especially to a machine in which each squeegee holder cooperates with suspension members situated outside both ends of the stencil. A machine constructed in this way is distinguished in that the squeegee blade with its fitting is supported by the squeegee holder at two locations. By a correct selection of the suspension points, the deflection of the squeegee holder in a vertical plane will be minimal when the squeegee is downwardly loaded. The mass inertia moment of the squeegee holder may now be taken considerably smaller than that of the conventional squeegee holder. Since the load owing to the squeegee pressure is smaller with the invention than in the conventional construction, the total load is considerably smaller than previously so that for that reason a lighter construction is possible and therefore a greater breadth of the machine can be achieved while maintaining a uniform pressure of the squeegee along the entire length of the cylindrical stencil which is generally about 1.5 meters and preferably 2.0 or even 2.4 meters.

It is a further object of the invention to provide means to position the pressure area of the squeegee blade permanently in essentially a fixed desired zone of the stencil nothwithstanding adjustments in the pressure angle of the blade. This zone may lie either exactly above the zone of contact between the stencil and the web or at a short distance before or behind that zone.

The aforementioned and further objects of the invention will hereinafter be described with reference to the accompanying drawings which are exemplary, showing a few embodiments of the squeegee device according to the invention, wherein:

[FIG. 10 are diagrams showing the deflection of the blade in the prior art (a) and according to the present invention (b).]

Figure 1:
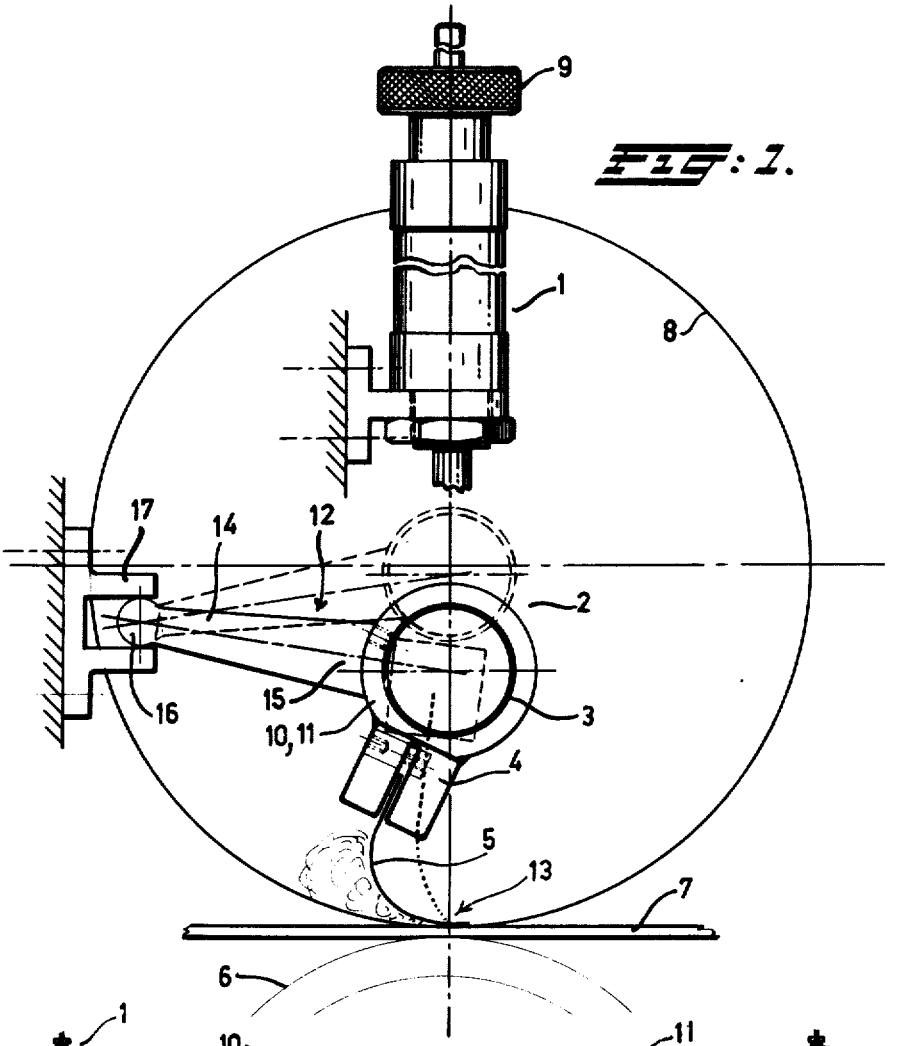
FIG. 1 shows a cross-section of a stencil provided with this squeegee device according to a first embodiment.

The rotary screen printing machine to which this invention relates is of the type as described, e.g. in the U.S. Nos. 3,291,044, 3,304,860, 3,313,232 and 3,420,167. In such a machine e.g. twelve or sixteen juxtaposed supporting members are provided for the ends of as many cylindrical stencils. For the sake of simplicity all this is not represented in the drawings.

The machine is likewise provided with suspension members 1 for the squeegee device 2 within each stencil. The latter device consists of a squeegee holder 3 provided with a fitting 4 for a flexible squeegee blade 5. The machine is further provided with means such a roller 6 for guiding the material to be printed. When this material is sufficiently rigid in itself, it may directly bear on the means 6 embodied as supporting rollers, but in the case of weak material, like e.g. textile, a supporting belt 7 can be applied in the usual way.

In the previously known machines the squeegee blade mostly consists of rubber or other such flexible material. According to the present invention the squeegee blade 5 consists of a thin metal strip of stainless steel or spring steel the thickness of which is less than 1% of the generally vertical width of the portion of the strip which freely protrudes from the fitting 4, and greater than 0.1% of this width. If desired, it is also possible to apply a strip of synthetic material, provided this material has an elastic flexibility analogous to that of metal. Such a material may be Vulkolan or Teflon, depending on the type of paste or paint used.

The suspension members 1 each consist of a pneumatic cylinder (see FIG. 2) the piston of which is pivotally secured to the squeegee device by suitable bearing means, by which means the squeegee device 2 can be lifted and lowered in order to release the squeegee blade 5 from the cylindrical stencil 8 or bring it again into contact therewith. The lower position of the squeegee device 2 and as a consequence the angle at which the blade 5 exerts its printing function is adjusted by the aid of the adjusting nut 9.

Figure 2:
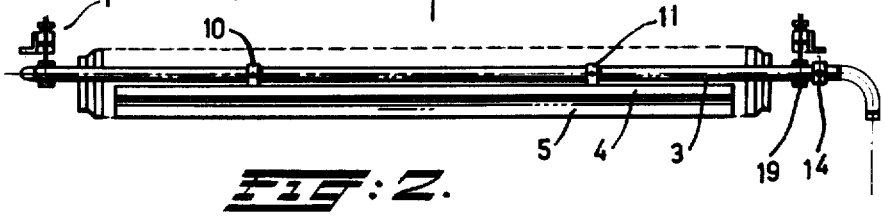
FIG. 2 shows to a considerably smaller scale a side elevation of a complete squeegee device.

As is visible in FIG. 2, each squeegee blade 5 is via its fitting 4 supported at two locations 10 and 11 by the squeegee holder 3. This holder is constructed as a tube serving as a printing paste or paint feeding conduit.

The locations 10 and 11 are so selected with respect to the ends of the holder 3 that the deflections [$(d_2)$] at the ends of the blade 5 are almost equal to the deflection [$(d_3)$] of the blade at its center. Both of these values of deflection are considerably less than the maximum deflection [$(d_1)$] resulting when the blade 5 is secured along its entire length to the holder 3. [These deflection relationships can be best seen in FIG. 10.]

Means 12 are provided in each squeegee device 2 cooperating with the squeegee-holder 3 in order to displace the latter in a generally horizontal direction during its height adjustment in such a manner, that the pressure area 13 of the squeegee blade 5 is always situated in a substantially fixed zone of the stencil that is to say the zone which is in touch with the material to be printed, or a region at a short distance before or after that zone. These means 12 consist of an arm 14 outside at least one end of the stencil 8.

This arm 14 is connected at its one end 15 with the squeegee holder 3, and is pivotally supported at its other free end 16. Since in this embodiment the suspension members 1 exclusively allow a vertical displacement of the squeegee holder 3, the end 16 of the arm 14 can undergo, via the bracket 17, a limited shifting in a direction parallel to the travel of the material to be printed, that is to say, of the belt 7. This construction causes a turning of the squeegee holder 3 on lowering the squeegee device 2 and a tilting of the supporting locations 10 and 11 and consequently of the fitting 4 in such a manner that the pressure area 13 of the squeegee blade 5 remains within the correct region.

Figure 3:
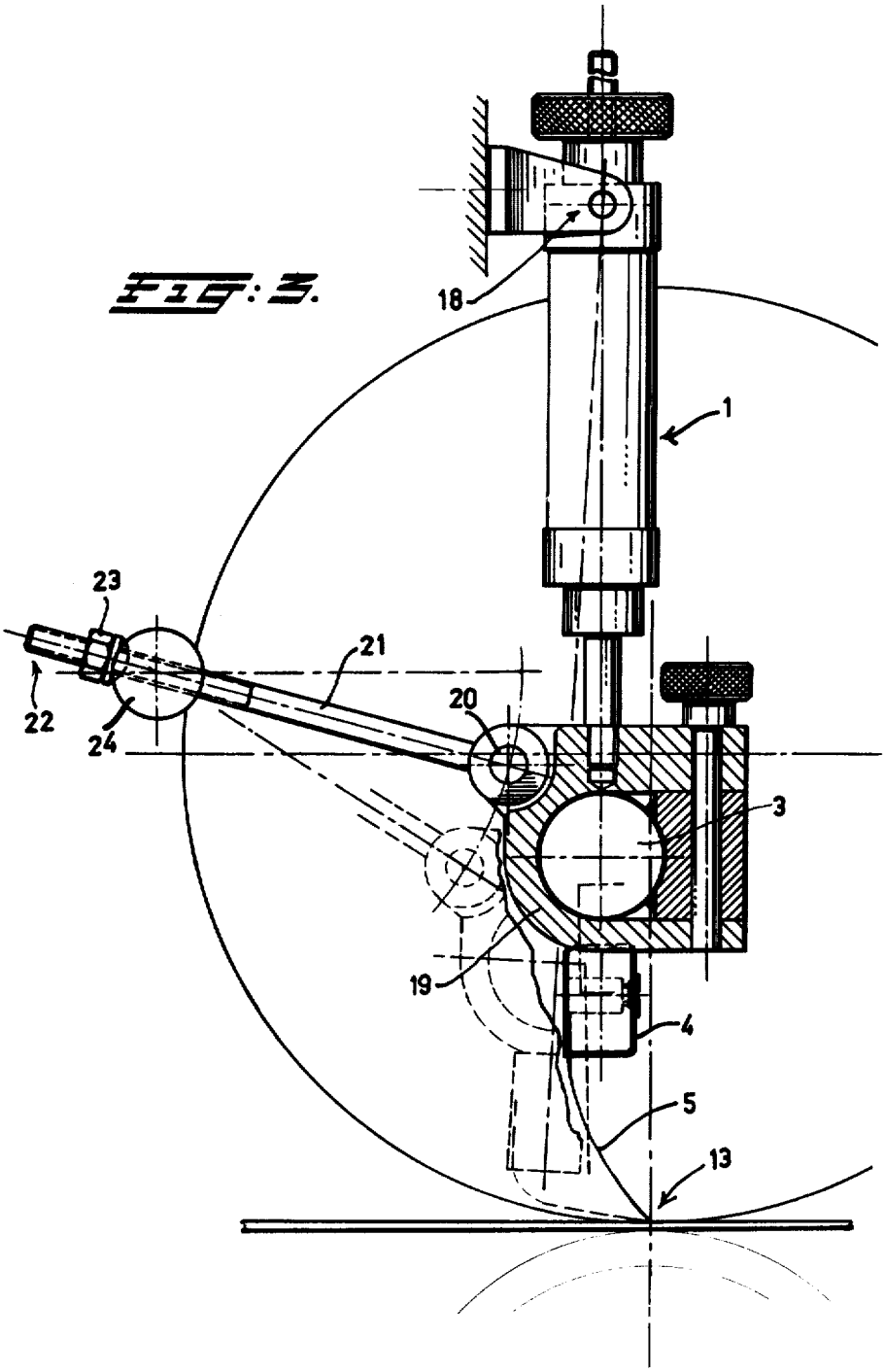
FIG. 3 is another embodiment of the squeegee device in a section corresponding to FIG. 1.

In the embodiment according to FIG. 3 the suspension members 1 are pivoted at 18 to the frame of the machine. Each suspension member 1 is secured to the squeegee holder 3 by means of a clip 19 which loosely surrounds the holder 3 and permits striding rotational movement thereof relative to the dip 19. These clips are situated outside the ends of each stencil 8 and are each pivotally connected with one end of an arm 21 through a tenon 20. Each arm 21 has at its free end 22 a point of support 24 pivotable about a fixed axis which however is adjustable by means of a nut 23. These elements 19–24 constitute an equivalent of the means 12, as described with reference to FIG. 1.

Figure 4:
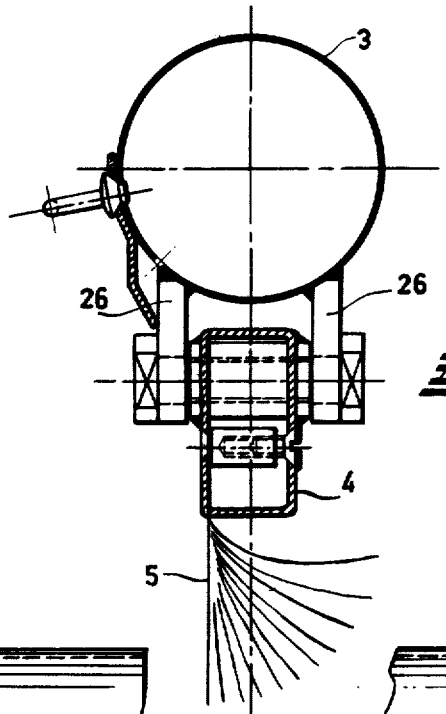
FIG. 4 shows a detail of the squeegee device according to a third embodiment.
Figure 5:
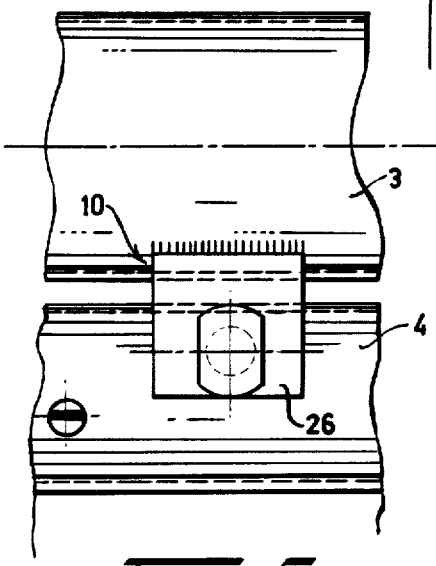
FIGS. 5 and 6 show a front view of the two suspension points of the squeegee with its fitting to the holder in the embodiment according to FIG. 4.
Figure 6:
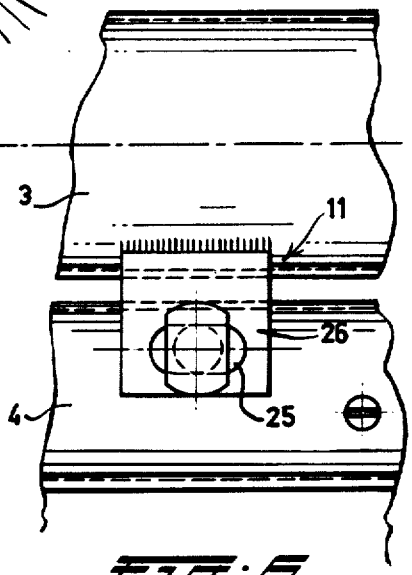

FIG. 4 shows an embodiment of one of the supporting locations 10 or 11 at which the fitting 4 of the squeegee blade 5 is supported by the squeegee holder 3. FIG. 5 shows a view of the supporting location 10 at which the fitting is fixed to the holder 3 for rotation therewith. The supporting location 11 depicted in FIG. 6 is provided with an elongated hole 25 in the connecting strips 26, so that there is a limited possibility of longitudinal movement between the fitting 4 and the holder 3 to allow for differences in the bowed lengths of these under vertical pressure.

This limited possibility of relative displacement is of importance because the vertical deflection of the squeegee holder or paint feeding conduit 3 is generally different from the corresponding vertical deformation of the combination fitting 4 with squeegee blade 5 resulting in different lengths of these when bowed by application of vertical pressure against the stencil 8.

Figure 7:
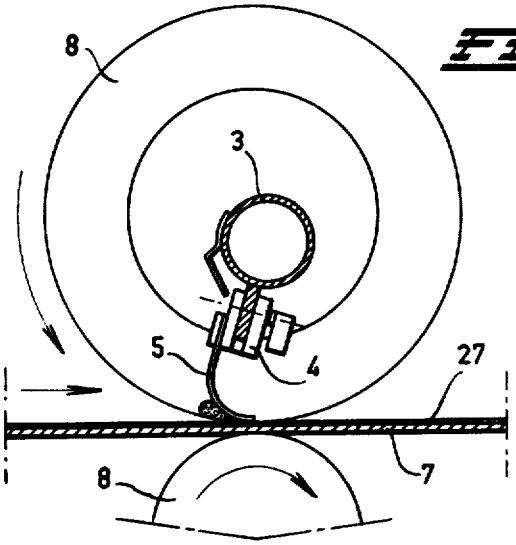
FIGS. 7-9 show the influence of the location of the pressure area of the squeegee[; and].
Figure 7A:
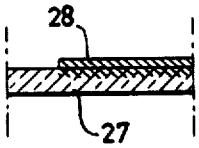
Figure 8:
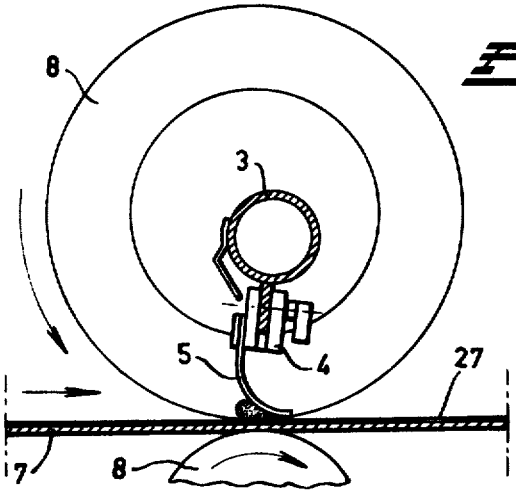
Figure 8A:
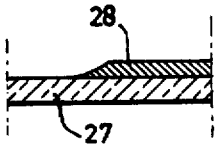
Figure 9:
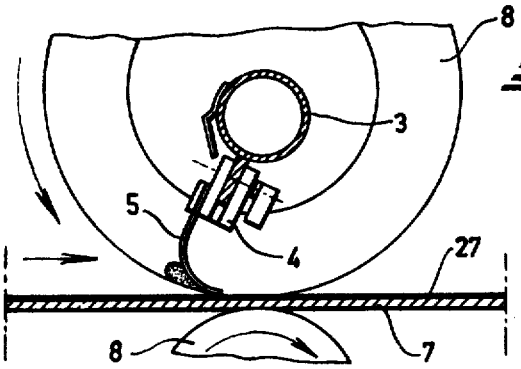
Figure 9A:
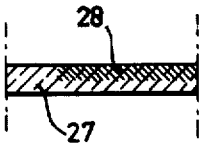

FIG. 7 shows the situation in conformity with the FIGS. 1 and 3, a paint imprint 28 being formed on the web 27 to be printed, the imprint being partially on and in the web (see FIG. 7A). When the layer of paint should be entirely on the web and the penetration of the paint into the web should be reduced to a minimum, the pressure area of the squeegee 5 should be slightly shifted to behind or beyond the point according to FIG. 7. This situation is attained by unscrewing slightly the nut 23 from the construction according to FIG. 3. Should it be desired for the paint to be entirely pressed into the web, then the arm 21 of FIG. 3 is slightly shortened so that the conditions according to FIG. 9 occur.

The advantages of the machine according to the invention can be summarized as follows:

- the occurring forces and the weight of the squeegee device can be reduced in such a considerable manner, that the width of the machine can be increased without the risk of a harmful vertical deflection of the squeegee that is to say without light and dark coloured zones being produced on printing,
- the friction between the steel squeegee and the nickel stencil is less than with a rubber squeegee, which is favorable from the viewpoint of wear and tear and consequently for the life of the squeegee device and the stencil,
- the metal squeegee allows a particularly great variation in pressure angle ranging between 90° and about 3°,
- using a metal squeegee requires a much smaller force for applying the same amount of paint than in case of a conventional squeegee, which contributes to obtaining a light weight construction,
- the two-point suspension of the squeegee results in smaller maxima of the deflection of the squeegee than with the conventional securing of the squeegee along its entire length,
- no chemical corrosion is produced in the case of a metal squeegee because stainless steel can be utilized, but also spring steel which has been subjected to a special surface treatment, such as a surface coating to reduce chemical corrosion.

It will be understood that this invention is susceptible to modification in order to adapt it to different usages and conditions, and accordingly, it is desired to comprehend such modifications within this invention as may fall within the scope of the appended claims.

What is claimed is:

1. A rotary screen printing machine having a frame, supporting members for the ends of one or more cylindrical stencils and with suspension members mounted on the frame for a squeegee device disposed within the stencil and consisting of a squeegee holder with a fitting for a flexible squeegee blade, and with means for guiding the material to be printed; the improvement consisting in that the squeegee blade consists of a thin flexible metal strip, the thickness of which is less than 1% of the width of the portion of the strip which freely protrudes from the fitting, said squeegee holder being supported at least on one end by suspension members and the squeegee blade with its fitting being supported by the squeegee holder [at two spaced locations], the suspension members of each squeegee holder comprising means for adjusting the height of the squeegee blade within the stencil, and further comprising means connecting the squeegee holder with the frame and permitting displacement of the holder in a generally horizontal direction, parallel to the guiding direction of the material to be printed during the adjustment for height, in such manner that the pressure area of the squeegee blade is situated permanently in a substantially fixed desired zone of the stencil.

2. A machine according to claim 1 whereby said [lastnamed] *lastnamed* means comprises an arm outside at least one end of the stencil, said arm being connected at one end thereof, to said squeegee holder and being pivoted at the other end thereof to the frame.

3. A machine according to claim 2, wherein the suspension members exclusively permit a vertical displacement of the squeegee holder, said one end of said arm being rigidly secured to said squeegee holder, said other end of said arm being slidingly mounted in said frame for limited sliding movement in a generally horizontal direction as well as pivoting movement.

4. A machine according to claim 2, wherein said one end of said arm is pivotally secured to said squeegee holder, said other end of said arm being pivotally connected to the frame by a fixed pivot.

5. A machine according to claim 4, further comprising means for shifting the position of said pivot.

*6. A machine according to claim 1 wherein said squeegee blade with its fitting is supported by the squeegee holder at two spaced locations.*

* * * * *